United States Patent [19]

Horowitz

[11] Patent Number: 5,475,427
[45] Date of Patent: Dec. 12, 1995

[54] VIDEO SIGNAL NOISE SUPPRESSION CIRCUIT

[75] Inventor: Harvey M. Horowitz, San Diego, Calif.

[73] Assignee: Eastman Kodak Company, Rochester, N.Y.

[21] Appl. No.: 248,904

[22] Filed: May 25, 1994

[51] Int. Cl.⁶ ..................................... H04N 5/14
[52] U.S. Cl. .................. 348/241; 348/607; 348/250
[58] Field of Search ...................... 348/241, 250, 348/607; 327/72, 94, 96, 310, 312; H04N 5/14

[56] References Cited

U.S. PATENT DOCUMENTS

| 4,287,441 | 9/1981 | Smith | 327/94 |
| 4,549,215 | 10/1985 | Levine | 348/250 |
| 4,644,287 | 2/1987 | Levine | 327/94 |
| 4,716,317 | 12/1987 | Spierings | 327/310 |
| 4,845,382 | 7/1989 | Eouzan et al. | 327/94 |
| 4,987,321 | 1/1991 | Toohey | 327/96 |
| 5,086,344 | 2/1992 | D'Luna et al. | 348/241 |
| 5,216,509 | 6/1993 | Hirasawa | 348/241 |

*Primary Examiner*—James J. Groody
*Assistant Examiner*—Glenton B. Burgess
*Attorney, Agent, or Firm*—William F. Noval

[57] ABSTRACT

Imaging apparatus includes a solid state sensor and a noise suppression circuit for suppressing noise in a video output signal generated by the image sensor.

4 Claims, 2 Drawing Sheets

IN CLAMP OUT

CLAMP PULSE IN

SAMPLE PULSE IN

OUTPUT

VIDEO SIGNAL NOISE SUPPRESSION CIRCUIT

FIELD OF INVENTION

This invention relates in general to video signal processing apparatus and relates more particularly to a noise suppression circuit for a video signal produced by a solid state image sensor

BACKGROUND OF THE INVENTION

Solid state image sensors include a linear or matrix array of photosensitive elements which convert a light image incident upon the photosensitive elements into a video signal corresponding to the light signal. A typical solid state image sensor is a full frame CCD image sensor. The sensor is exposed to a light image which converts the light intensity to a charge distribution accumulated by the photosensitive array. At the end of the exposure period, the charge accumulated by the photosensitive array is serially read out from the sensor as a series of video signals having a reset level signal and a video information level signal. One problem with a solid state image sensor is that the process of reading out the video signal from the sensor introduces noise components into the output video signal, which is undesirable.

Commonly assigned U.S. Pat. No. 4,987,321, issued Jan. 22, 1991, inventor Toohey, discloses a processing circuit for an image sensor which cancels noise and distortion from an imaging system which has a solid state CCD sensor. The processing circuit includes four sample and hold circuits; two buffer circuits; a pair of source followers, which are all on a common semiconductor substrate; and further has a differential amplifier which is not on the common substrate. Although this processing circuit is useful for its intended purpose, it would be desirable to provide a noise reduction circuit which is simpler and less expensive.

The following U.S. Patents disclose various multiple sample and hold signal processing circuits which do not provide a solution to the problem of providing a simple and less expensive noise reduction circuit for a video signal produced by a solid state image sensor. U.S. Pat. No. 4,717,883, issued Jan. 5, 1988, inventor Browning; U.S. Pat. No. 4,446,486, issued May 1, 1984, inventor Itoh; U.S. Pat. No. 5,081,372, issued Jan. 14, 1992, inventor Pelgrom; and U.S. Pat. No. 4,631,518, issued Dec. 23, 1986, inventor Caspell.

SUMMARY OF THE INVENTION

According to the present invention, there is provided a solution to the problem in the prior art of a simple and less expensive noise reduction circuit for a video signal produced by a solid state image sensor. According to an aspect of the present invention, a noise suppression apparatus comprising: a video signal input terminal for receiving a video signal including noise components having a reset level signal and an information level signal; a first sample and hold circuit having an input terminal connected to the video signal input; an output terminal and a control terminal; a subtraction circuit having a first input terminal connected to the output terminal of the first sample and hold circuit, a second input terminal, connected to the video signal input terminal, and an output terminal; a second sample and hold circuit having an input terminal connected to the output terminal of the subtraction circuit, a control terminal, and an output terminal; and a control circuit (a) for producing a first control signal which is applied to the control terminal of the first sample and hold circuit to control the first sample and hold circuit to sample the reset level signal of the video signal and to hold a signal value representative thereof; and (b) for producing a second control signal which is applied to the control circuit of the second sample and hold circuit to sample the information level signal of the video signal and to hold a signal value representative thereof; whereby to produce at the output terminal of the second sample and hold circuit a video signal having the noise component suppressed.

DETAILED DESCRIPTION OF THE DRAWINGS

DESCRIPTION OF THE PREFERRED EMBODIMENTS

Figure 1:
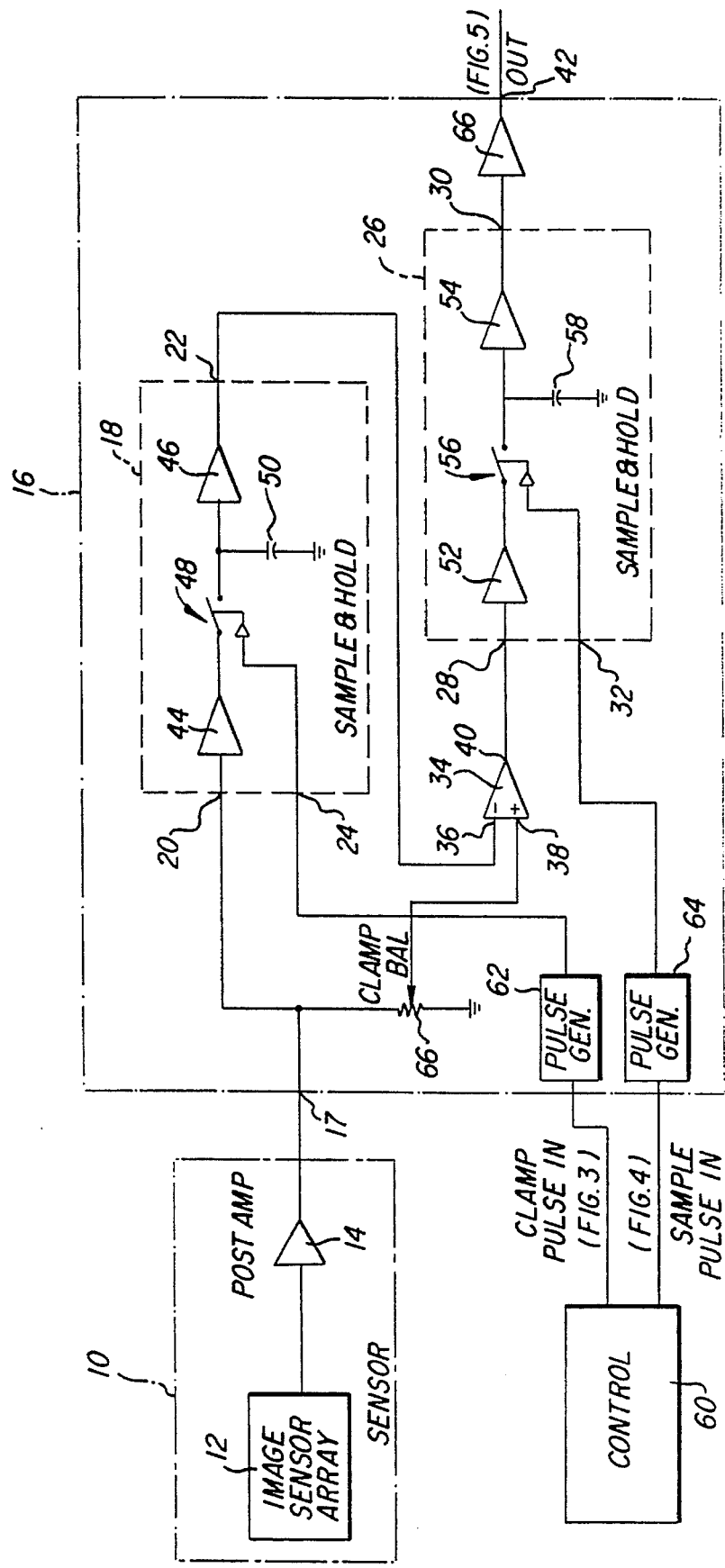
FIG. 1 is a partially schematic, partially block diagram of an embodiment of the present invention.

Referring now to FIG. 1, there is shown an image sensor signal circuit, including an embodiment of the present invention. As shown, a solid state sensor 10 includes an image sensor array 12 which produces a video signal which is amplified by post-amplifier 14. Typically, the operation of sensor 10 is as follows.

Figure 2:
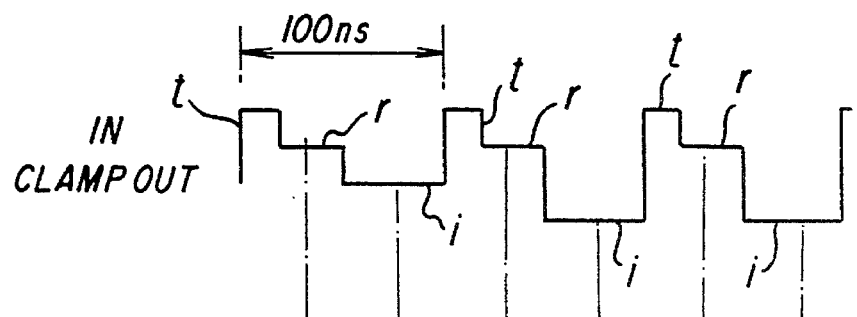
FIGS. 2–5 are respective signal diagrams, useful in explaining the operation of the invention of FIG. 1.

Sensor array 12 is exposed by opening a shutter located between the sensor array and the lens which images a scene on sensor array 12. The light intensity distribution of the incident image on array 12 is converted to a charge distribution accumulated by the photodetector array during the exposure period. At the end of the exposure period, the shutter is closed and the charge accumulated by the array is transported one row at a time to a horizontal output register. The contents of the horizontal output register are then shifted serially to an output circuit which converts each charge packet to a voltage level. Before shifting out each charge packet, the output circuit is charged to a fixed reset voltage level. The output voltage signal is amplified by post-amplifier 14, which is a wide band amplifier. Referring to FIG. 2, there is shown the wave form of the output video signal for three clock cycles. The wave form for each clock cycle includes a reset tangent t, a reset voltage level r, and a video information voltage level i.

The output video signal shown in FIG. 2 includes undesirable noise components introduced by the video signal generation process. According to the present invention, there is provided a noise suppression circuit 16 which reduces or suppresses any noise components in the video signal. In general, noise suppression circuit 16 employs a correlated double sampling technique to reduce noise level.

Noise suppression circuit 16 includes a first sample and hold circuit 18 having an input terminal 20, an output terminal 22, and a control terminal 24; a second sample and hold circuit 26 having an input terminal 28, an output terminal 30, and a control terminal 32; a subtraction circuit comprising a differential amplifier 34 having first and second input terminals 36 and 38 and an output terminal 40. Noise suppression circuit 16 has a video signal input terminal 17 and an output terminal 42.

Figure 3:
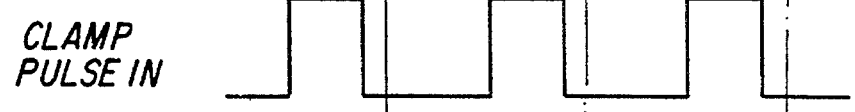
Figure 4:

Sample and hold circuit 18 includes input buffer amplifier 44, output buffer amplifier 46, solid state switch 48, and capacitor 50. Similarly, second sample and hold circuit 26 includes input buffer amplifier 52, output buffer amplifier 54, solid state switch 56, and capacitor 58. A control (such as a microcontroller) 60 produces a "clamp pulse in" signal shown in FIG. 3 and a "sample pulse in" signal shown in FIG. 4. Pulse generators 62 and 64 respectively receive the "clamp pulse in" signal and "sample pulse in" signal and produce control signals which are applied respectively to control terminals 24 and 32 of sample and hold circuit 18 and 26. The input terminal 20 of sample and hold circuit 18 is connected to the video signal input terminal 17. Output terminal 22 of sample and hold circuit 18 is connected to the first input terminal 36 of differential amplifier 34. The second input terminal 38 of differential amplifier 34 is connected to the video signal input terminal 17 by way of adjustable resistor 66. The output terminal 40 of differential amplifier 34 is connected to the input terminal 28 of second sample and hold circuit 26. The output terminal 30 of second sample and hold circuit 26 is connected to the output terminal 42 of noise suppression circuit 16 by means of buffer amplifier 66.

The circuit of FIG. 1 operates as follows. The output video signal from sensor 10 (as shown in FIG. 2) is received by noise suppression circuit 16 at video signal input terminal 17. The input video signal is applied to the input terminal 20 of first sample and hold circuit 18. During the period of the reset level signal of the video signal, the control signal generated by pulse generator 62 is applied to the control terminal 24 of first sample and hold circuit 18 to momentarily close switch 48 in order to sample the reset level r of the input video signal. A representation of the reset level is stored on capacitor 50. The signal stored on capacitor 50 is available at the output terminal 22 of sample and hold circuit 18 and is applied to the first input terminal 36 of differential amplifier 34. The video signal applied to terminal 17 is also applied to the second input terminal 38 of differential amplifier 34. Differential amplifier 34 subtracts the reset sample level from the input signal resulting in a translation of the reset level to ground. This signal appears at the output terminal 40 of differential amplifier 34 and is applied to the input terminal 28 of second sample and hold circuit 26.

Figure 5:

During the period of the information (i) level signal of the input video signal, the control signal generated by pulse generator 64 is applied to input terminal 32 of second sample and hold circuit 26. This signal causes solid state switch 56 to momentarily close to sample the information level signal of the video signal. This sample is stored on capacitor 58, which is available to the output terminal 30 of second sample and hold circuit 26 and, consequently, output terminal 42 of circuit 16. FIG. 5 shows a representative output wave form appearing at terminal 42 of circuit 16.

Since the noise suppression circuit 16 operates on each clock cycle, it suppresses low frequency noise components in the video signal applied at input terminal 17.

The noise suppression circuit of the present invention finds applicability in imaging apparatus, including solid state sensors.

It is to be understood that the specific components mentioned in this specification are exemplary embodiments that are intended merely to be illustrative of the spirit and scope of the claims of this invention. Modifications can readily be made by those skilled in the electronics arts consistent with the principles of this invention. For example, a variety of different sample and hold circuits, buffer circuits, control circuits, and amplification circuits can be used.

What is claimed is:

1. A noise suppression apparatus comprising:

a video signal input terminal for receiving a video signal including noise components having a reset level signal and an information level signal;

a first sample and hold circuit having an input terminal connected to said video signal input; an output terminal and a control terminal;

a subtraction circuit having a first input terminal connected to said output terminal of said first sample and hold circuit, a second input terminal, connected to said video signal input terminal, and an output terminal;

a second sample and hold circuit having an input terminal connected to said output terminal of said subtraction circuit, a control terminal, and an output terminal; and a control circuit (a) for producing a first control signal which is applied to said control terminal of said first sample and hold circuit to control said first sample and hold circuit to sample said reset level signal of said video signal and to hold a signal value representative thereof; and (b) for producing a second control signal which is applied to said control terminal of said second sample and hold circuit to sample said sample and hold circuit to sample said information level signal of said video signal and to hold a signal value representative thereof; whereby to produce at said output terminal of said second sample and hold circuit a video signal having said noise component suppressed.

2. The apparatus of claim 1 wherein said subtraction circuit is a differential amplifier.

3. The apparatus of claim 1 wherein said first sample and hold circuit includes an input buffer amplifier, a solid state switch, a capacitor and an output buffer amplifier.

4. The apparatus of claim 1 wherein said second sample and hold circuit includes an input buffer amplifier, a solid state switch, a capacitor, and an output buffer amplifier.

* * * * *